July 30, 1963    F. G. REUTER    3,099,044
APPARATUS FOR MAKING ARTICLES OF POLYURETHANE PLASTICS
Filed Sept. 10, 1958    3 Sheets-Sheet 1

INVENTOR.
FRANZ GOTTFRIED REUTER
BY
ATTORNEYS

INVENTOR.
FRANZ GOTTFRIED REUTER

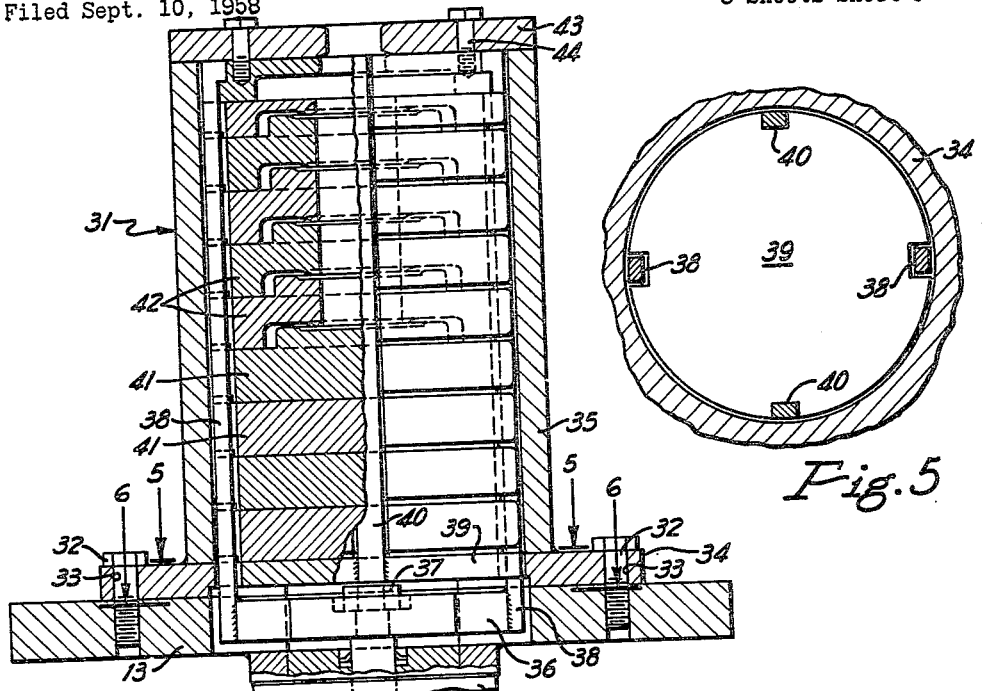
Fig. 4
Fig. 5
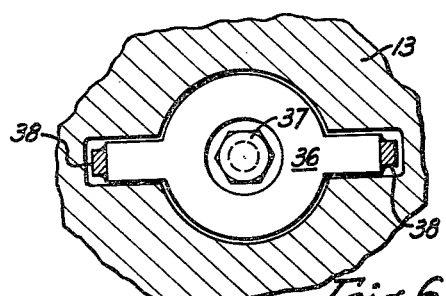
Fig. 6
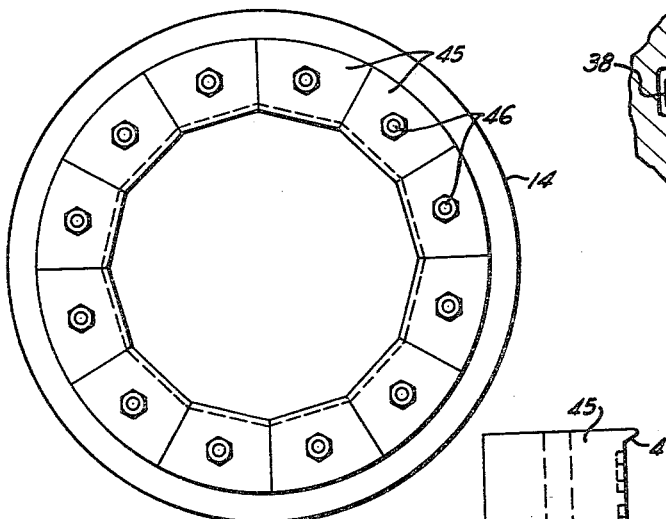
Fig. 7
Fig. 8
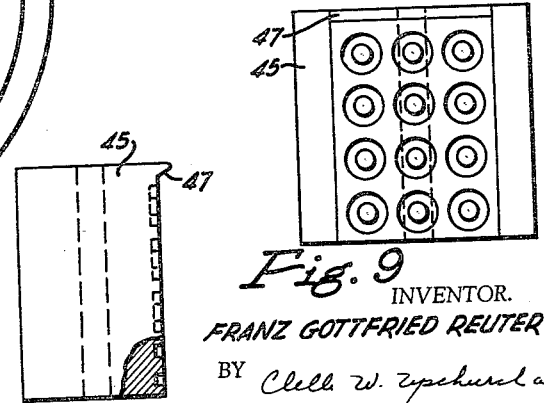
Fig. 9
INVENTOR.
FRANZ GOTTFRIED REUTER
BY
ATTORNEYS United States Patent Office 3,099,044
Patented July 30, 1963

3,099,044
APPARATUS FOR MAKING ARTICLES OF POLYURETHANE PLASTICS
Franz Gottfried Reuter, Lemforde, Hannover, Germany, assignor, by mesne assignments, to Mobay Chemical Company, Pittsburgh, Pa., a corporation of Delaware
Filed Sept. 10, 1958, Ser. No. 760,215
Claims priority, application Germany Sept. 13, 1957
6 Claims. (Cl. 18—26)

This invention relates to an apparatus for centrifugally coating polyurethane plastics and, more particularly, to nonporous rubber-like elastic polyurethane plastic articles.

It has been proposed heretofore to cast polyurethane plastics by simply pouring the plastics in hte molten stage into suitable molds. Often the polyurethane plastic articles manufactured by the heretofore known apparatuses contain small amounts of entrapped air in the form of bubbles and, moreover, the manufacture of polyurethane plastic articles by the heretofore known apparatuses were not conducive to economical mass production. It has also been proposed heretofore to provide elastic covers for cylinders used on printing devices, such as, typewriters, mimeograph machines, and the like. These elastic covers have heretofore been manufactured of a textile reinforced rubber which made their manufacture complicated and expensive. Aside from the necessary textile reinforcement, these elastic covers have had to be subjected to separate grinding operations to remove all surface irregularities formed by the manufacturing process. Also the elastic rubber coverings tend to become brittle and hard, thus having but a limited service life.

It is, therefore, a primary object of the present invention to provide an apparatus for casting polyurethane plastic articles which is adapted to cast any desired shaped article. Still another object of the present invention is to provide an elastic cylinder cover which may be produced in a simple and inexpensive way and which has an almost unlimited service life. It is a further object of the present invention to provide an apparatus for economically casting articles of rubber-like nonporous polyurethane plastics. Still another object of the present invention is to provide an apparatus for casting rubber-like polyurethane plastic articles which may be easily and quickly adapted to cast any desired shape. It is another object of the invention to provide an apparatus to cast rubber-like polyurethane articles of various shapes concurrently. It is a further object of the invention to provide an apparatus for casting nonporous rubber-like polyurethane plastic articles in large numbers so that speed and economy of operation are obtained. It is still another object of the present invention to provide means for curing the polyurethane castable melt into rubber-like polyurethane articles while the apparatus is in operation. Another object is to provide an apparatus capable of casting polyurethane rubber-like articles free of voids or bubbles of entrapped air.

Other objects will become apparent from the following description in which:

FIGURE 3 is an enlarged detailed view of a mold used for casting printing rolls and the like;

FIGURE 4 is a sectional view of a casting device adapted to be detachably connected to the mounting plate of the apparatus shown in FIGURE 1;

FIGURE 5 is a sectional view taken in the direction of the arrows 5—5 in FIGURE 4;

FIGURE 6 is a sectional view taken in the direction of the arrows 6—6 in FIGURE 4;

FIGURE 7 is a schematic view illustrating one suitable type of mold elements;

FIGURE 8 is a side view of one of the mold elements shown in FIGURE 7; and

FIGURE 9 is a front elevation view of the mold elements shown in FIGURE 8.

The above objects and others are accomplished in accordance with the present invention, generally speaking, by providing an apparatus adaptable for centrifugally casting a plurality of articles of differing shapes. For instance, the apparatus may be used to cast a large number of relatively long cylindrical articles having tubular metal reinforcing elements therein, or may be used to cast a large number of simple washers and the like, or the apparatus may be used to cast both long cylindrical articles and simple washers at the same time. Furthermore, the device may be adapted to cast a plurality of complicated shaped articles such as polyurethane plastic bearing races, by the provision of a plurality of matched molds stacked one on the other.

Figure 1:
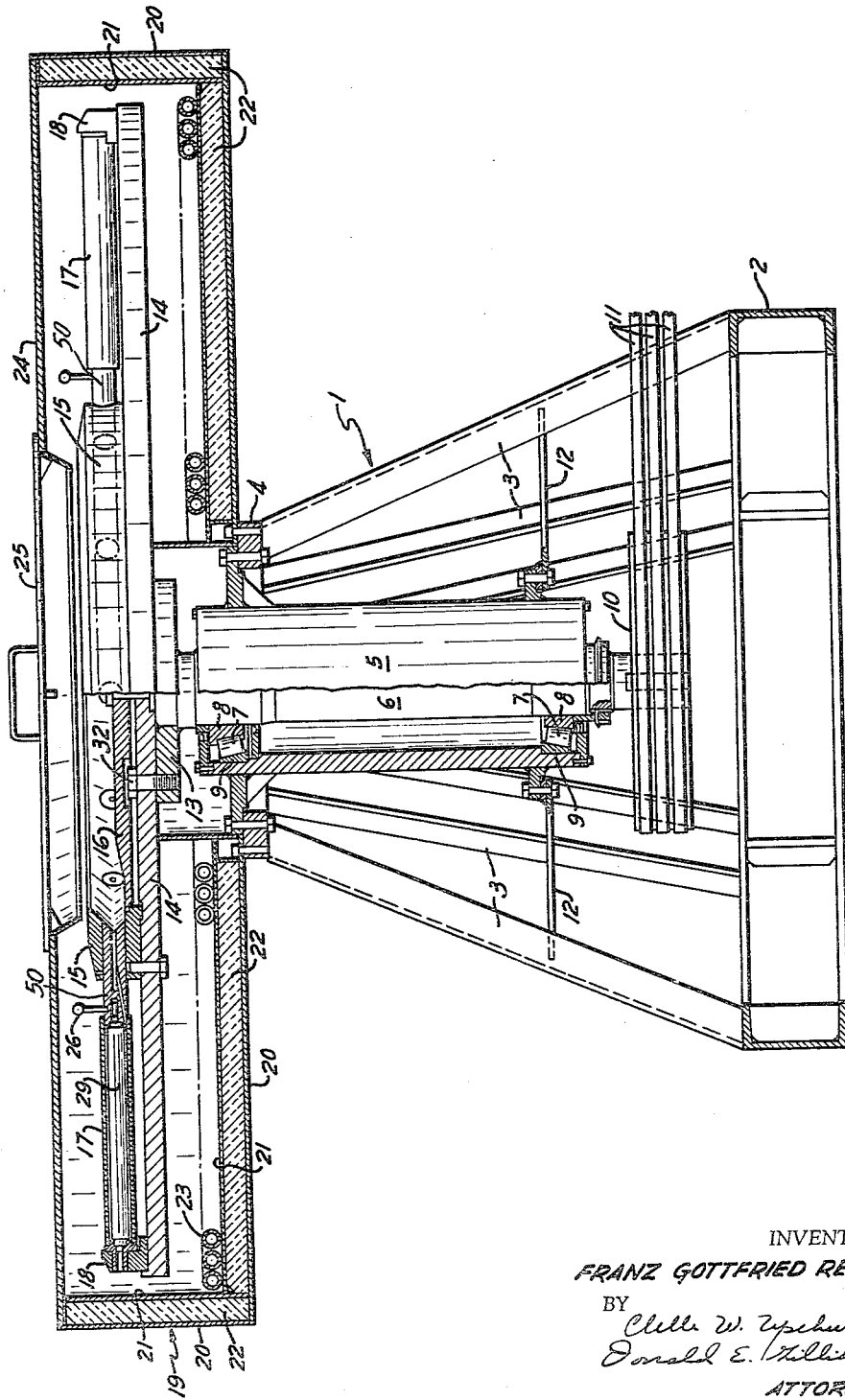
FIGURE 1 is a front elevation view of one embodiment of the apparatus provided by the present invention.

The casting apparatus 1 illustrated in FIGURE 1 is provided with a base member 2 and an upstanding frame having a plurality of supports 3. Attached at the upper end of the supports is a collar member 4 connecting all of the upstanding supports 3. Attached to the collar member 4 and centrally disposed within the supports 3 is a drive shaft housing 5 containing a drive shaft 6. The drive shaft 6 is suspended in the drive shaft housing 5 by top and bottom bearings 7 which rotate on drive shaft races 8 and drive shaft housing races 9. The bottom of the drive shaft 6 is provided with a multiple pulley wheel 10. Driving power is transmitted from a power source (not shown) by means of a plurality of belts 11. At the lower end of the drive shaft housing 5 is provided bracing means 12 which connect with the supports 3, thus reinforcing and rigidizing the apparatus. At the upper end of the drive shaft is provided a mounting plate 13 to which a relatively large mounting wheel 14 is detachably connected. The mounting wheel may be detachably connected to a suitable mold-positioning element 15. The mold-positioning element 15 is generally circular in shape and is of about one-half the diameter of the mounting wheel 14 in the embodiment illustrated. An interior plate-like member 16 is provided which fits snugly within the mold-positioning element 15 and is attached to the mounting plate 13. The interior plate-like member 16 as provided to direct the flow of castable polyurethane melt into the mold-positioning element 15 as it is being introduced into the apparatus. Suitable molds 17 are connected to the mold-positioning element 15 by insert members 50 which are inserted into bores through the wall of the mold-positioning element 15. The insert members 50 slide into the bores and are movable with respect to the mold-positioning element 15. The molds 17 and insert members 50, as a unit are securely locked in place with mold-securing elements 18 which are positioned outwardly on the molding wheel 14. Attached to the collar member 4 and completely enclosing the molding wheel 14 is an insulated-enclosing element 19 having on the bottom and sides double walls 20 and 21 with an insulating material 22 therebetween. Positioned immediately over the inerior bottom wall in juxtaposed relation is a coil of a suitable heating element 23. The top wall 24 of the enclosing member 19 is provided with a lid 25.

In the operation of the apparatus of FIGURE 1, a liquid polyurethane melt is introduced through the opening in the top wall 24 which flows over the interior plate member 16 and is directed by the mold-positioning element 15 into the suitable molds 17, while the mounting wheel is being turned in the range of from about 200 r.p.m. to about 600 r.p.m. The liquid is then, while the mounting table continues to rotate, cured and solidified through the addition of heat by the coils 23.

Figure 2:
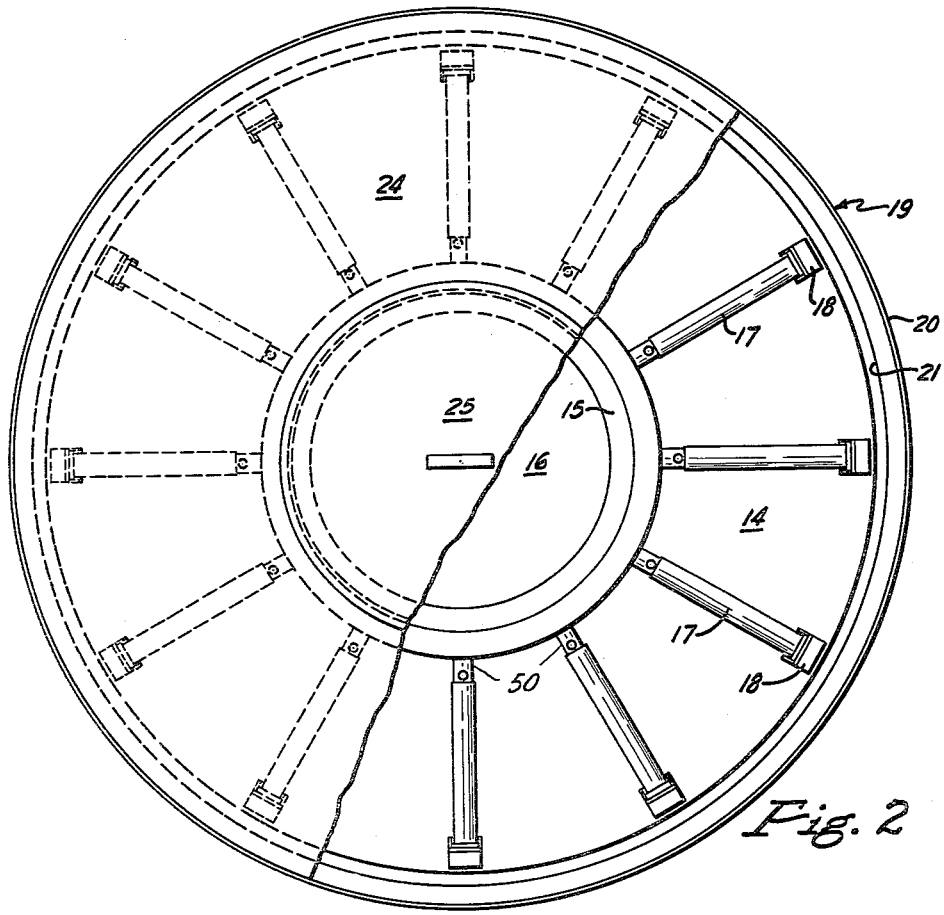
FIGURE 2 is a horizontal plan view partially in section and taken in the direction of the arrows 2—2 of FIGURE 1.

FIGURE 2 is a plan view looking down on the apparatus and illustrating the relation between the various elements. The top wall 24 and lid 25 are partially broken away to illustrate the side walls 20 and 21 of the enclosing element 19 and the mounting wheel 14. The interior plate-like member 16 is shown in the central area. Suitable molds 17 are connected to the mold-positioning element 15 by insert members 50 which are inserted in the mold-positioning element 15 in a spaced relation. Each mold 17 and insert member 50 as a unit are secured in place by the mold-securing elements 18 which are mounted on the periphery of the mounting wheel 14. It is to be noted that while only a relatively small number of molds are shown, the number of molds to be mounted is limited only by the size of the machine. As illustrated in FIGURE 2, for example, at least about 36 molds could be readily accommodated. It is necessary, however, that the molds 17 be mounted in spaced relation on the mounting wheel in order to achieve the proper balance and prevent vibration from occurring as the apparatus is being used.

Figure 3:
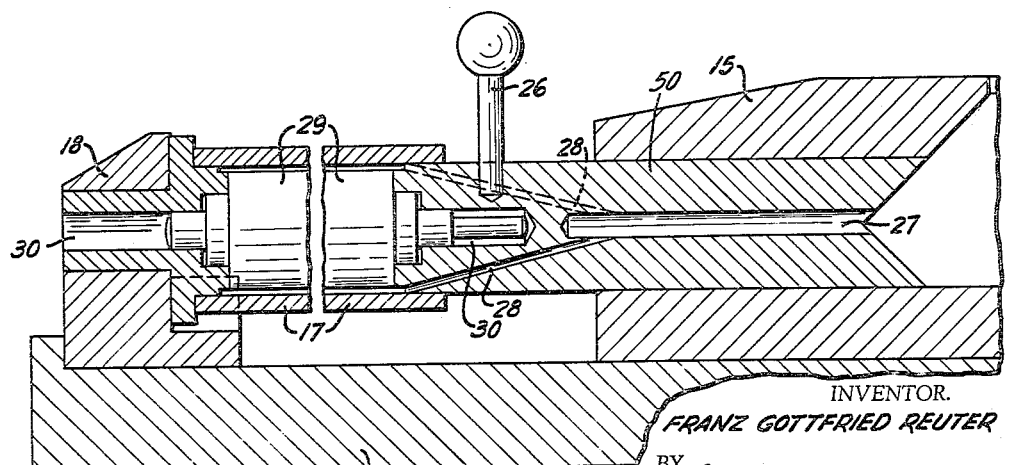

FIGURE 3 is a detailed cross-sectional view of the mounting wheel 14, mold-positioning element 15, mold 17, insert member 50 and the mold-securing means 18. The interior of this mold 17 has been carefully polished and honed to insure that the surface of the layer of polyurethane plastic cast therein is free of all surface irregularities. The insert members 50 are provided with a centrally disposed port 27 from which radiates a plurality of smaller ports 28 to the mold cavity. The embodiment illustrated is that of a printing roll, and, thus, a reinforcing metal tube 29 is securely positioned therein by inserting the ends thereof into respective cavities 30 at each end of the mold. In operation the insert member 50 is inserted into one of the bores of the mold-positioning element 15 with the aid of the handle member 26. The insert member 50 is moved through the bore toward the center of the cavity formed by the mold-positioning element 15 and the interior plate member 16. The mold 17 is positioned around the reinforcing metal tube 29 and this assembly as a unit is placed in position between the mold securing means 18 and the insert member 50. The insert member 50 is then moved toward the mold-securing means 18 causing the ends of the reinforcing metal tube 29 to move into the cavities 30.

FIGURE 4 illustrates a device 31 which may be readily attached to the mounting plate 13 of the apparatus shown in FIGURE 1. The device 31 is detachably connected to the mounting plate 13 by bolts 32 through bolt-receiving holes 33 in base member 34 of the device 31. To the base member 34 is affixed a cylindrical housing 35. In the interior of the housing and at its lower end is provided a mold-receiving plate member 36 which is affixed to the drive shaft 6 by bolt 37. To the mold-receiving plate member 36 is affixed two opposed vertically-disposed bar guides 38. Over the bar guides 38 is inserted a mold base member 39 to which are attached opposed bar guides 40 so that there are four equally spaced-apart bar guides 38 and 40 around the periphery of the base member 39. Into the bar guides may be stacked in vertical relation spacers 41 or matched mold elements 42 which are so designed to enable the manufacture of complicated shapes, such as, bearing races and the like. A lid member 43, which is securely affixed to the housing 35, is provided with bolts 44, for tightening the stacked mold elements.

As best shown in FIGURES 7, 8, and 9, respectively, large mold blocks 45 may be positioned on the mounting wheel 14 of the apparatus shown in FIGURE 1. The molds 45 are adapted to form simple shapes, such as, washers and the like, in great numbers. Then the mold blocks 45 are radially spaced around the center of the mounting wheel 14 in juxtaposed relation, and are securely affixed to the mounting wheel 14 by bolts 46. In the embodiment illustrated, the face of each mold element is planar, however, the face may be readily machined into a concave configuration so that the complete interior of the ring formed by the mold blocks 45 will be cylindrical. Each of the mold blocks 45 have at their upper edges a small projection 47 which prevents the flow of the polyurethane melt out of the mold blocks.

The apparatus provided by the present invention is suitable for casting any suitable substantially nonporous or homogeneous rubber-like polyurethane. Polyurethane. Polyurethanes may be prepared by reacting any suitable polyisocyanate with any suitable organic compound having reactive hydrogen atoms and capable of reaction with the polyisocyanate to form a polyurethane. For example, 1,5-naphthylene diisocyanate, p-phenylene diisocyanate, or 4,4'-diphenyl dimethyl methane diisocyanate may be reacted with a polyester, polyalkylene ether glycol, a polythioether glycol, and the like having terminal groups which are predominately hydroxyl groups and a molecular weight of at least 750, and the resulting product may be cross-linked with an organic chain extender or cross-linker. Suitable cross-linking agents include ethylene glycol, diethylene glycol, butanediol, diprimary aliphatic and aromatic diamines, such as, toluene diamine or the like. Indeed, any organic compound having reactive hydrogen atoms, organic polyisocyanate, and cross-linker disclosed in U.S. Patents 2,729,618; 2,621,166; and 2,620,516 may be used in forming a polyurethane; and any of the processes disclosed in these patents may be followed in making a polyurethane suitable for being cast by the apparatus of the present invention.

The following example illustrates the preparation of one polyurethane suitable for forming shaped articles by the casting apparatus provided by this invention:

*Example 1*

1,000 parts by weight of an hydroxyl polyester obtained by thermal esterification of about 11 mols of adipic acid with about 12 mols of ethylene glycol and having an hydroxyl number of about 52 and an acid number of about 1 are heated to a temperature of about 130° C. and under a vacuum of about 12 mm. until the formation of bubbles has stopped and the polyester is completely free from water. Now, 180 parts by weight of naphthylene-1,5-diisocyanate are added at 135° C. to the dehydrated polyester while stirring. As soon as the temperature starts to drop, 20 parts by weight of butylene glycol-1,4 are stirred into the mixture at about 135° C. The resulting mixture is then poured onto the flat plate-like member 16. Centrifugal force then carries the polyurethane melt into the centrally-disposed ports 27 in the insert members 50 and then through the radially-disposed ports 28 and around the rigid reinforcing member 29. The mounting wheel 14 is rotating in the range of from about 200 r.p.m. to about 600 r.p.m. The polyurethane melt is maintained at a temperature of about 110° C. supplied by the heating coils 23 while the mounting wheel 14 continues to rotate for about ½ hour to form a homogeneous rubber-like polyurethane. After 2 hours, the shaped article is removed from the mold and the rubber-like polyurethane then shows the following properties: Shore A hardness 70°, resiliency 40%, elongation 600%.

It is to be understood that any suitable organic polyisocyanate, organic compound having reactive hydrogen atoms and cross-linking agent may be substituted for those in the foregoing example. Examples of materials suitable for this purpose are found in the aforesaid patents. Moreover, it is to be understood that variations are permissible in the temperatures and processing steps insolong as the product obtained has the required physical characteristics.

As indicated hereinbefore, the molecular weight of the organic compound having reactive hydrogen atoms which is reacted with the organic polyisocyanate in the preparation of the polyurethane should be preferably at least about 750. Although the chemistry involved in the preparation of the polyurethane is not specifically involved in this invention, because any polyurethane having desired physical characteristics may be cast in the apparatus provided by the present invention, it is considered advisable to point out that the polyester may be prepared by esterification of any suitable polycarboxylic acid, such as, for example, adipic acid, succinic acid, and the like. A desirable polyalkylene ether glycol may be prepared by the condensation of a lower alkylene oxide, such as, for example, ethylene oxide, propylene oxide, butylene oxide, and the like.

While several specific polyurethane rubber-like articles have been disclosed as being capable of being formed by the apparatus of the present invention, it is pointed out that many articles, both large and small, may also be made with the use of the apparatus provided by the present invention. For instance, the apparatus may be adapted to make rubber-like polyurethane vehicle tires and the like.

The novel printing roller provided in accordance with the invention has an elastic covering of a nonporous rubber-like polyurethane. The covering is cast about a hollow tubular reinforcing element at each end of which is provided means for placing the roller in a printing apparatus, such as, a typewriter and the like. In another embodiment of the invention the tubular reinforcing element is first covered with a layer of cellular polyurethane about which is cast the layer of elastic nonporous polyurethane.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. An apparatus for centrifugally casting plastic products comprising a mounting plate connected to and rotatably driven by a drive shaft, a mounting wheel detachably connected to said mounting plate, a mold-positioning element detachably connected to said mounting wheel, said mold-positioning element being concentric with said mounting plate and said mounting wheel, a plate member fitting within said mold-positioning element and attached to said mounting plate to direct the flow of plastic material introduced therein, said mold-positioning element having a plurality of bores through the wall thereof, a plurality of molds each of which defines a mold cavity, each of said molds being connected to said mold-positioning element by an insert member, each of said insert members being slidably disposed in one of said bores in said mold-positioning element and movable radially with respect thereto, each of said insert members having a passageway therethrough to convey the plastic material to said mold cavity and a mold securing means on the periphery of said mounting wheel for holding said molds in place.

2. The apparatus of claim 1 surrounded by a housing said housing having a top wall, a cylindrical side wall and a base wall said side and base walls being a double wall having insulation therebetween.

3. The apparatus of claim 1 in which heating means are provided adjacent said mold-positioning element and said plurality of molds.

4. An apparatus for coating the metal core of printing rollers with polyurethane plastic material comprising a mounting plate connected to and rotatably driven by a drive shaft, a mounting wheel connected to said mounting plate, a mold-positioning element comprising a cylindrical body and having bores through the wall thereof said mold-positioning element connected at the base of said cylinder to said mounting wheel, means for connecting a plurality of cylindrical molds to said mold-positioning element, said means including an insert member for each mold slidably disposed along a radius of said mounting wheel and in one of said bores through said wall of said mold-positioning element, said insert member having a passageway therethrough to conduct said polyurethane plastic material to said cylindrical molds, a core positioned within said mold and a core retaining means for holding said core in position thereby forming an annular space between said core and the cylindrical wall of said mold, said core being suitable for insertion into a printing machine and a mold securing means on the periphery of said mounting wheel for holding said molds in place.

5. The apparatus of claim 4 in which heating means are provided adjacent said mold-positioning element and said plurality of molds.

6. The apparatus of claim 4 in which the internal surface of said cylindrical mold is highly polished.

References Cited in the file of this patent

UNITED STATES PATENTS

| 1,675,132 | Merle | Jan. 24, 1928 |
| 1,666,403 | Alexanian | Apr. 17, 1928 |
| 1,668,763 | Dickson | May 8, 1928 |
| 1,738,995 | Hamer | Dec. 10, 1929 |
| 1,977,531 | Sperry | Oct. 16, 1934 |
| 2,019,064 | Apple | Oct. 29, 1935 |
| 2,209,400 | Hauck | Sept. 10, 1940 |
| 2,296,460 | McDonald | Sept. 22, 1942 |
| 2,378,042 | Sorensen | June 12, 1945 |
| 2,442,718 | Woock | June 1, 1948 |
| 2,448,640 | Weston | Sept. 7, 1948 |
| 2,542,757 | Dubin | Feb. 20, 1951 |
| 2,618,031 | Mazer | Nov. 18, 1952 |
| 2,629,130 | Rempel | Feb. 24, 1953 |
| 2,753,642 | Sullivan | July 10, 1956 |
| 2,763,032 | Fay | Sept. 18, 1956 |
| 2,838,797 | Kolar | June 17, 1958 |
| 2,847,707 | Sullivan | Aug. 19, 1958 |
| 2,899,297 | Magel | Aug. 11, 1959 |

FOREIGN PATENTS

| 363,142 | Great Britain | Dec. 17, 1931 |
| 749,541 | Great Britain | May 30, 1956 |